United States Patent
Mitulal et al.

(10) Patent No.: US 10,439,952 B1
(45) Date of Patent: Oct. 8, 2019

(54) PROVIDING SOURCE FAIRNESS ON CONGESTED QUEUES USING RANDOM NOISE

(71) Applicant: Cisco Technology, Inc., San Jose, CA (US)

(72) Inventors: Vinod Mitulal, Santa Clara, CA (US); Krishnan Subramani, San Jose, CA (US); Peter Newman, Fremont, CA (US); Georges Akis, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 15/204,314

(22) Filed: Jul. 7, 2016

(51) Int. Cl.
   *H04L 12/863* (2013.01)
   *H04L 12/801* (2013.01)
   *H04L 12/835* (2013.01)

(52) U.S. Cl.
   CPC .............. *H04L 47/62* (2013.01); *H04L 47/12* (2013.01); *H04L 47/30* (2013.01)

(58) Field of Classification Search
   CPC combination set(s) only.
   See application file for complete search history.

(56) References Cited

U.S. PATENT DOCUMENTS

| | | | |
|---|---|---|---|
| 6,606,301 B1 * | 8/2003 | Muller | H04L 47/10 370/230 |
| 6,650,640 B1 * | 11/2003 | Muller | H04L 49/602 370/392 |
| 6,681,327 B1 * | 1/2004 | Jardin | H04L 29/06 713/153 |
| 7,773,519 B2 | 8/2010 | Prabhakar et al. | |
| 8,477,615 B2 | 7/2013 | Prabhakar et al. | |
| 9,100,313 B1 | 8/2015 | Mazolla et al. | |
| 9,106,574 B2 | 8/2015 | Newman et al. | |
| 2002/0141427 A1 * | 10/2002 | McAlpine | H04L 47/39 370/413 |
| 2005/0073956 A1 * | 4/2005 | Moores | H04L 47/20 370/235 |
| 2013/0250757 A1 * | 9/2013 | Tabatabaee | H04L 47/266 370/230 |
| 2013/0262542 A1 * | 10/2013 | Tkacik | G06F 7/58 708/250 |
| 2013/0262543 A1 * | 10/2013 | Abdoo | G06F 7/58 708/250 |
| 2014/0023085 A1 * | 1/2014 | Aliseychik | H04L 49/90 370/412 |

(Continued)

OTHER PUBLICATIONS

Sally Floyd et al., "Random Early Detection Gateways for Congestion Avoidance", IEEE/ACM Transactions on Networking, Aug. 1993, 32 pages.

*Primary Examiner* — Yee F Lam
(74) *Attorney, Agent, or Firm* — Edell, Shapiro & Finnan, LLC

(57) ABSTRACT

A network device receives a packet at a port from among a number of ports. A queue threshold is randomly adjusted for a queue having an output buffer to which the packet is stored. When a fullness of the queue exceeds the adjusted queue threshold, at a time when the packet is to be enqueued into the queue, an action is performed. The action includes either dropping the received packet, or flow-controlling the port at which the packet is received.

21 Claims, 5 Drawing Sheets

(56) References Cited

U.S. PATENT DOCUMENTS

2014/0105218 A1* 4/2014 Anand ............... H04L 47/6255
                                                      370/412
2015/0271081 A1  9/2015 Arumilli et al.

* cited by examiner

PROVIDING SOURCE FAIRNESS ON CONGESTED QUEUES USING RANDOM NOISE

The present disclosure relates to data communications and traffic flow through a network device of an electronic data network.

BACKGROUND

In a network device such as, for example, a multi-port switch, incoming traffic arriving on all ports are serialized internally such that packets may be processed one at a time per clock interval. In a system in which each port is assigned to one or more time division multiplexing (TDM) timeslots, packets arriving on a port are pushed into an internal pipeline, one at a time during a TDM time slot corresponding to the port. The internal pipeline receives and processes one packet per clock interval. Simultaneously arriving packets would be presented to the internal pipeline for processing one after another.

In a many-to-1 scenario, in which multiple ports operating at a same rate send equal length packets to a same output queue, admission control logic processes the equal length packets serially based on TDM time slot per port assignments. The multiple ports may be operating at a maximum rate supported by the ports or at least a rate high enough to cause overload. If packets arrive at input ports at a high rate, the output queue may be oversubscribed (many-to-1) and packets may back-up in a buffer. If packets arrive at the maximum rate supported by the ports, once a buffer is completely filled, (N−1)/N (where N is a number of input ports) of the incoming equal length packets would be dropped. If the packets are dropped according to input arrival order, and the arrivals into the queue and departures out of the queue are synchronized, which can happen in various scenarios, input from a same port will be inserted onto the output queue every time a packet is dequeued, thereby causing unfairness to other ports.

One way to make the admission control logic fair across multiple input ports is to maintain per source, per destination, per class-of-service (i.e., per input per queue) admission count, which may be used to make drop decisions. This approach can be very expensive, especially when the number of input ports is large.

DESCRIPTION OF EXAMPLE EMBODIMENTS

Overview

Embodiments are presented herein that make source fairness available on congested queues using random noise. At a networking device, a packet is received at a port of a plurality of ports. A queue threshold is randomly adjusted for a queue of an output buffer to which the packet is to be stored. When a fullness of the queue exceeds the randomly adjusted queue threshold, an action for the packet is performed at a time when the packet is to be enqueued onto the queue. The action may include either dropping the received packet or flow-controlling the port at which the packet is received.

EXAMPLE EMBODIMENTS

Figure 1:
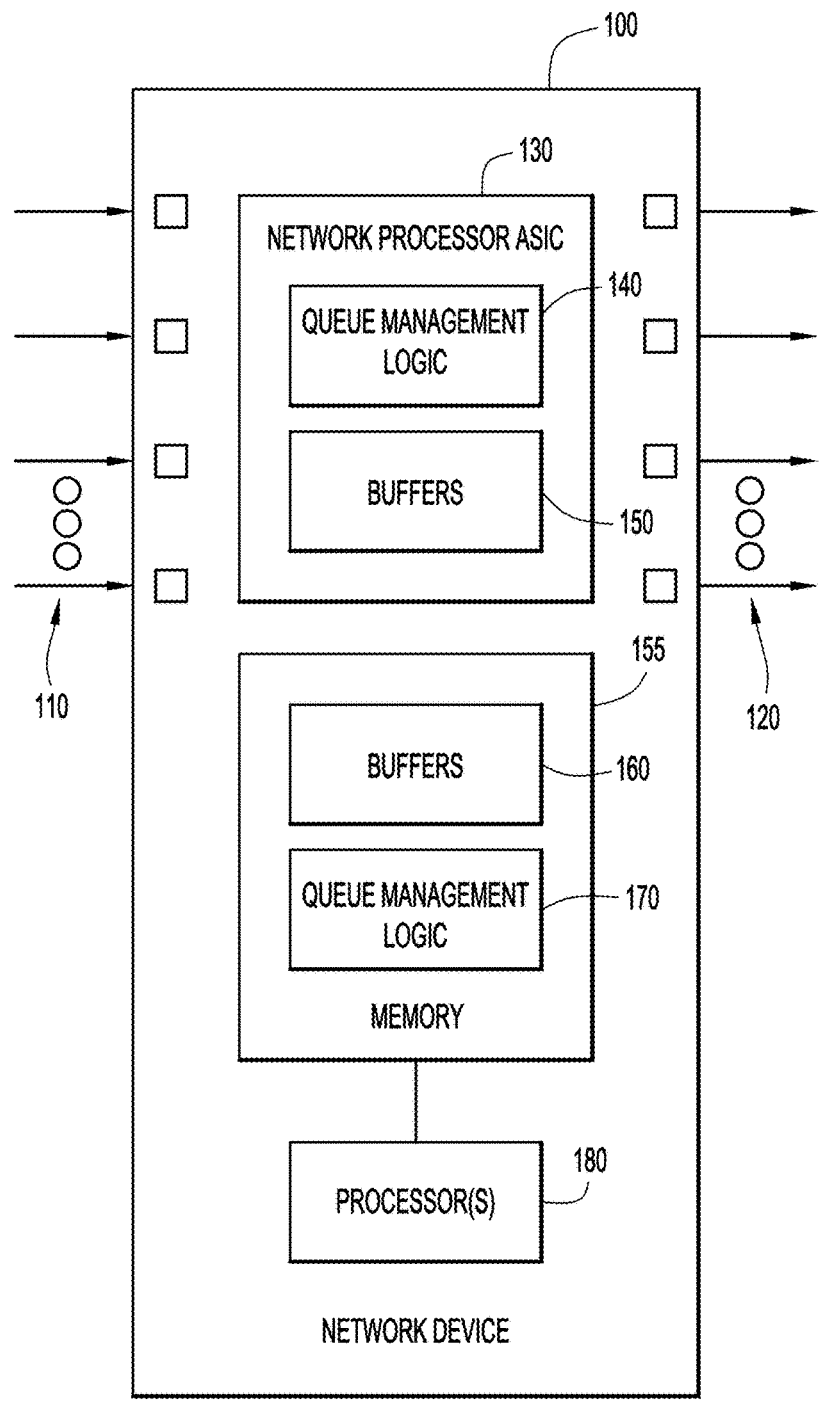
FIG. 1 shows an example of a network device configured to perform the queue management techniques, according to an example embodiment.

FIG. 1 illustrates an example network device 100 in which embodiments may be implemented. Network device 100 may have a first number of input ports 110 and a second number of output ports 120. In one embodiment, the network device 100 includes a network processor application specific integrated circuit (ASIC) 130, or multiple such ASICs. Network processor ASIC 130 may include fixed digital logic, programmable logic, or a combination thereof. For example, network processor ASIC 130 may include fixed or programmable digital logic integrated circuits, in which digital logic gates are configured to perform instructions of queue management logic 140. Network processor ASIC 130 may further include memory (not shown) and fixed or programmable digital logic for buffers 150.

Network device 100 may include network processor ASIC 130 or may include memory 155 and one or more processors 180 or may include network processor ASIC 130, memory 155 and one or more processors 180. Memory 155 may include a number of buffers 160 as well as queue management logic 170.

The one or more processors 180 may be one or more microprocessors or microcontrollers configured to execute program logic instructions such as queue management logic 170 for carrying out various operations and tasks described herein. For example, one or more processors 180 can execute queue management logic 170 stored in memory 155 (as e.g., software) in order to perform queue management techniques described herein. Memory 155 may include read only memory (ROM), random access memory (RAM), magnetic storage media, optical storage media, flash memory, electrical, or other physical/tangible (non-transitory) memory.

The functions of one or more processors 180 may be implemented by logic encoded in one or more non-transitory tangible computer readable media, wherein memory 155 may store data used for operations described herein and may store software or processor executable instructions that are executed to carry out the operations described herein.

Queue management logic 170 may take any of a variety of forms, so as to be encoded in one or more non-transitory tangible computer readable memory media or storage device (e.g., memory 155) for execution, such as fixed logic or programmable logic (e.g., software/computer instructions executed by a processor).

Figure 2:
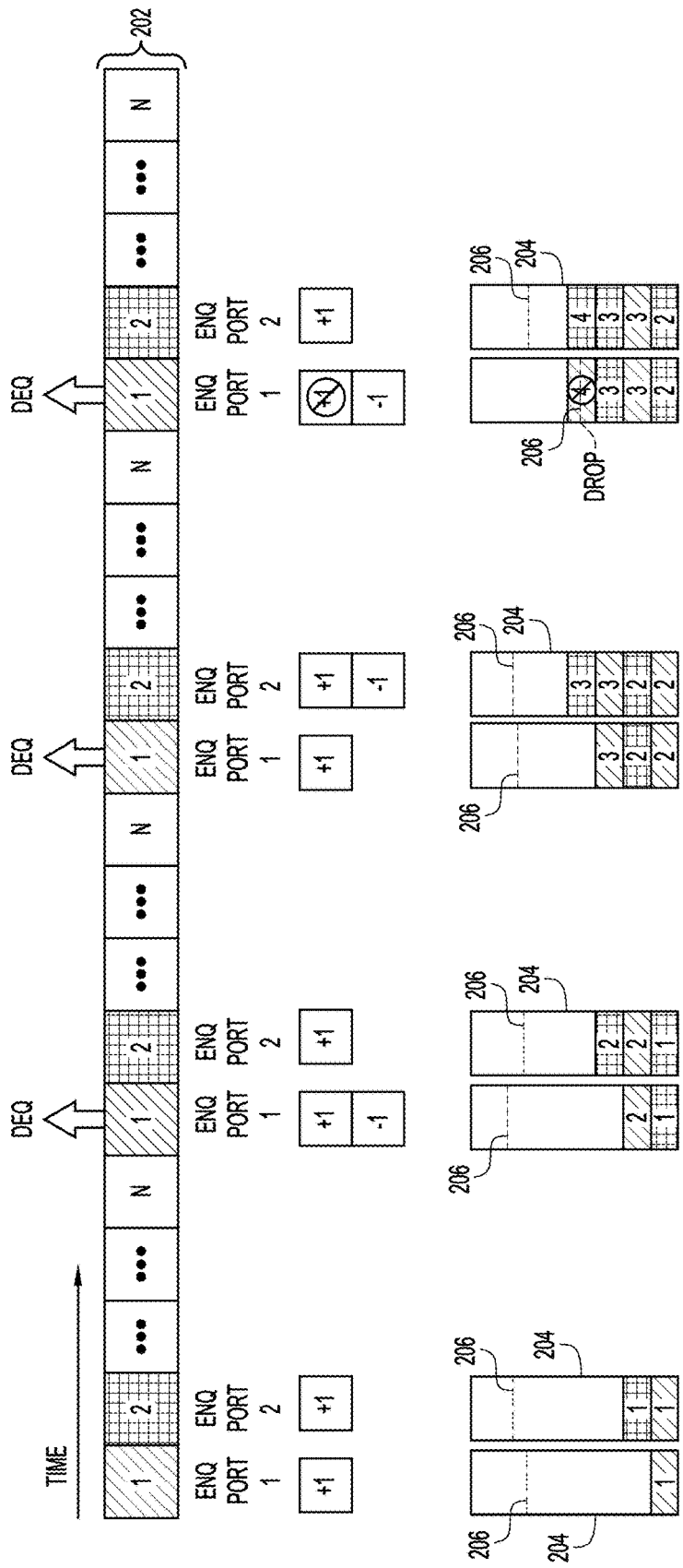
FIG. 2 illustrates an example of the queue management techniques, according to an example embodiment.

FIG. 2 illustrates example operation of the queue management techniques according to an example embodiment. FIG. 2 shows a number of TDM time slots 202. TDM time slots 202 marked with a 1 are assigned to port 1 and TDM time slots 202 marked with a 2 are assigned to port 2. Further, TDM time slots marked with a 1 are assigned to a process which dequeues a packet from a queue. FIG. 2 further shows a shared output buffer at reference numeral 204. The buffer 204 is shared across all the ports at which packets are received at the network device 100 (shown in FIG. 1). The shared buffer 204 has an adjustable queue threshold, shown in dotted lines at reference numeral 206, and the adjustable queue threshold is randomly adjusted when a packet is to be enqueued to the buffer 204. It should be understood to those with skill in the art that the packets may be stored separately from a list of pointers that point to the packets. This list of pointers may serve as the queue referred to herein.

In this example, at a first occurrence of TDM time slot 1 no attempt will be made to dequeue a packet from the queue because the queue is empty. However, a packet had arrived via port 1. Network device 100 may then generate a random number, may determine an adjusted queue threshold based on the generated random number, and may determine whether enqueueing the received packet to the buffer 204 may cause the adjusted queue threshold 206 to be exceeded. As explained further below, the random number may be an integer that is uniformly distributed in a range from zero to a maximum value, which may be configurable.

In this example, the adjusted queue threshold 206 would not be exceeded. Therefore, the packet may be enqueued to the buffer 204. In FIG. 2, a number, N, appearing in buffer 204 indicates that the packet was enqueued to the queue during an $N^{th}$ occurrence of a TDM timeslot, where N={1, 2, 3, 4}.

During a first occurrence of TDM time slot 2, network device 100 determines that a packet had arrived via port 2. Network device 100 may then generate a random number and may determine the adjusted queue threshold 206 based on the random number. Network device 100 may then determine whether the adjusted queue threshold 206 would be exceeded if the received packet is enqueued to the buffer 204. In this example, a determination is made that the adjusted queue threshold 206 would not be exceeded by enqueueing the packet onto the queue and the received packet is enqueued onto the queue.

After a period of time, a second occurrence of TDM slot 1 occurs. The queue for the buffer 204 now contains two packets (one from port 1 and one from port 2), and network device 100 dequeues the packet from port 1 from the queue for the buffer 204.

Since a new packet has been received from port 1, network device 100 may generate a random number and may determine an adjusted queue threshold 206 based on the generated random number. Network device 100 may then determine whether the adjusted queue threshold 206 would be exceeded if the newly received packet from port 1 is enqueued to the buffer 204. In this example, a determination is made that the adjusted queue threshold would not be exceeded and the newly received packet from port 1 is enqueued to the buffer. Presently, the queue in the buffer 204 contains a packet from port 2, and a packet from port 1.

During a second occurrence of TDM time slot 2, network device 100 determines that a packet from port 2 is received. Network device 100 may then generate a random number and may determine an adjusted queue threshold 206 based on the generated random number. Network device 100 may then determine whether the adjusted queue threshold 206 would be exceeded if the newly received packet from port 2 is enqueued to the queue for buffer 204. In this example, a determination is made that the adjusted queue threshold 206 would not be exceeded and the newly received packet from port 2 is enqueued to the buffer 204. The queue for the buffer 204 now contains a packet from port 2, a packet from port 1, and a second packet from port 2.

During a third occurrence of TDM time slot 1, network device 100 dequeues the packet from port 2.

Since a new packet has been received from port 1, network device 100 may generate a random number and may determine an adjusted queue threshold 206 based on the generated random number. Network device 100 may then determine whether the adjusted queue threshold 206 would be exceeded if the newly received packet from port 1 is enqueued to the queue for the buffer 204. In this example, a determination is made that the adjusted queue threshold 206 would not be exceeded and the newly received packet from port 1 is enqueued to the queue for the buffer 204. The queue for the buffer 204 now contains a packet from port 1, a packet from port 2, and a packet from port 1.

During a third occurrence of TDM time slot 2, network device 100 determines that a packet from port 2 is received. Network device 100 may then generate a random number and may determine an adjusted queue threshold 206 based on the generated random number. Network device 100 may then determine whether the adjusted queue threshold would be exceeded if the newly received packet from port 2 is enqueued to the queue for the buffer 204. A determination is made that the adjusted queue threshold would not be exceeded and the newly received packet from port 2 is enqueued to the queue for the buffer 204. The queue for the buffer 204 now includes a packet from port 1, a packet from port 2, a second packet from port 1, and a second packet from port 2.

During a fourth occurrence of TDM time slot 1, network device 100 dequeues the packet from port 1 from the buffer 204.

Since a new packet has been received from port 1, network device 100 may generate a random number and may determine an adjusted queue threshold 206 based on the generated random number. Network device 100 may then determine whether the adjusted queue threshold 206 would be exceeded if the newly received packet from port 1 is enqueued to the queue for the buffer 204. In this example, a determination is made that the adjusted queue threshold 206 would be exceeded and network device 100 determines an action to be performed. In this example, the action is to drop the packet that was received at port 1. At this point, the queue for the buffer 204 contains a packet from port 2, a packet from port 1, and a packet from port 2. The recently received packet from port 1 is dropped.

During a fourth occurrence of TDM time slot 2, network device 100 determines that a packet from port 2 is received. Network device 100 may then generate a random number and may determine an adjusted queue threshold 206 based on the generated random number. Network device 100 may then determine whether the adjusted queue threshold 206 would be exceeded if the newly received packet from port 2 is enqueued to the queue for the buffer 204. At this point, a determination is made that the adjusted queue threshold 206 would not be exceeded and the newly received packet from port 2 is enqueued to the queue for the buffer 204. The queue now has a packet from port 2, a packet from port 1, a second packet from port 2, and a third packet from port 2.

The foregoing description of FIG. 2 is meant by way of example to explain the operation of the random adjusted queue threshold that is generated and used to determine whether a packet should be enqueued to a shared buffer at a given point in time when that packet is received.

Figure 3:
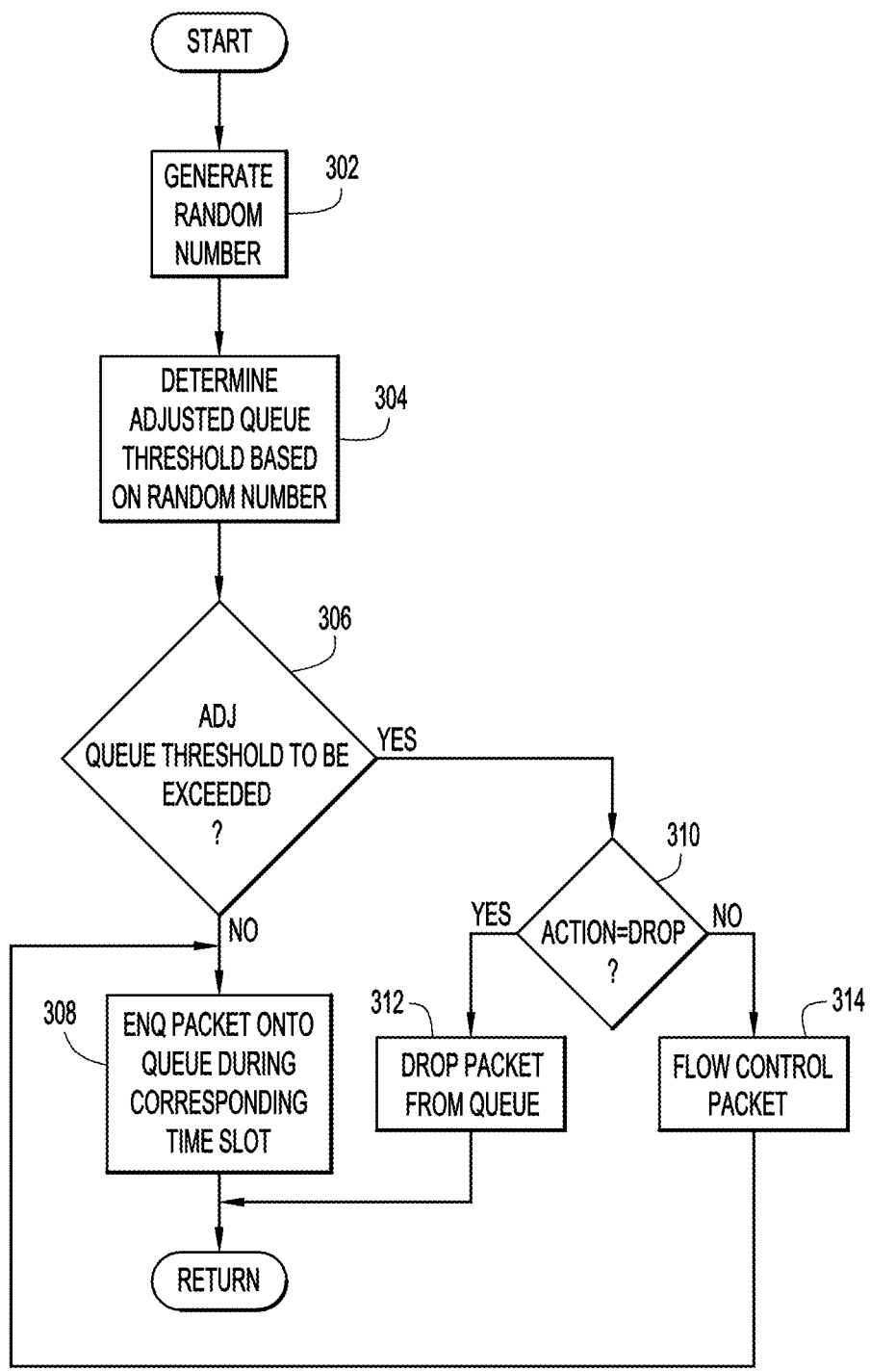
FIG. 3 is a flowchart illustrating queue management processing operations, according to an example embodiment.

Reference is now made to FIG. 3. FIG. 3 shows operations that may be performed when a packet has been received at a port and a TDM timeslot corresponding to the port is occurring. At 302, network device 100 may generate a random number. The random number may be an integer that is uniformly distributed in a range from zero to a maximum value, which may be configurable. In some embodiments, the maximum value may be 20. Although, in other embodiments, other maximum values may be used. The random number may be used as a percentage (e.g., between 0 and 20%) by which a maximum queue length or threshold for the queue of the buffer is reduced to generate the adjusted queue threshold at that point in time when a packet is to be enqueued to the shared buffer.

Next, at 304, the adjusted queue threshold for the queue may be determined based on the generated random number. For example, in some embodiments, if the random number is RN, then the adjusted queue threshold for the queue may be determined to be the maximum queue threshold less RN % of the maximum queue threshold, which can be expressed as:

adjusted_queue_threshold=max_queue_threshold−
(RN % of max_queue_threshold)

At 306, network device 100 may then determine whether enqueueing the received packet to the queue for the buffer would cause the adjusted queue threshold to be exceeded. If it is determined at 306 that the adjusted queue threshold will not be exceeded if the packet is enqueued to the queue for the buffer, then the packet is enqueued to the queue for the buffer at 308.

If it is determined at 306 that the adjusted queue threshold will be exceeded if the packet is enqueued to the queue for the buffer, then at 310, the network device 100 may determine whether an action to be performed is to drop the packet. If the action to be performed is to drop the packet, then the packet is dropped at 312. Otherwise, an assumption may be made that the action to be performed is a flow control of the port on which the packet was received and the port is flow controlled at 314.

Figure 4:
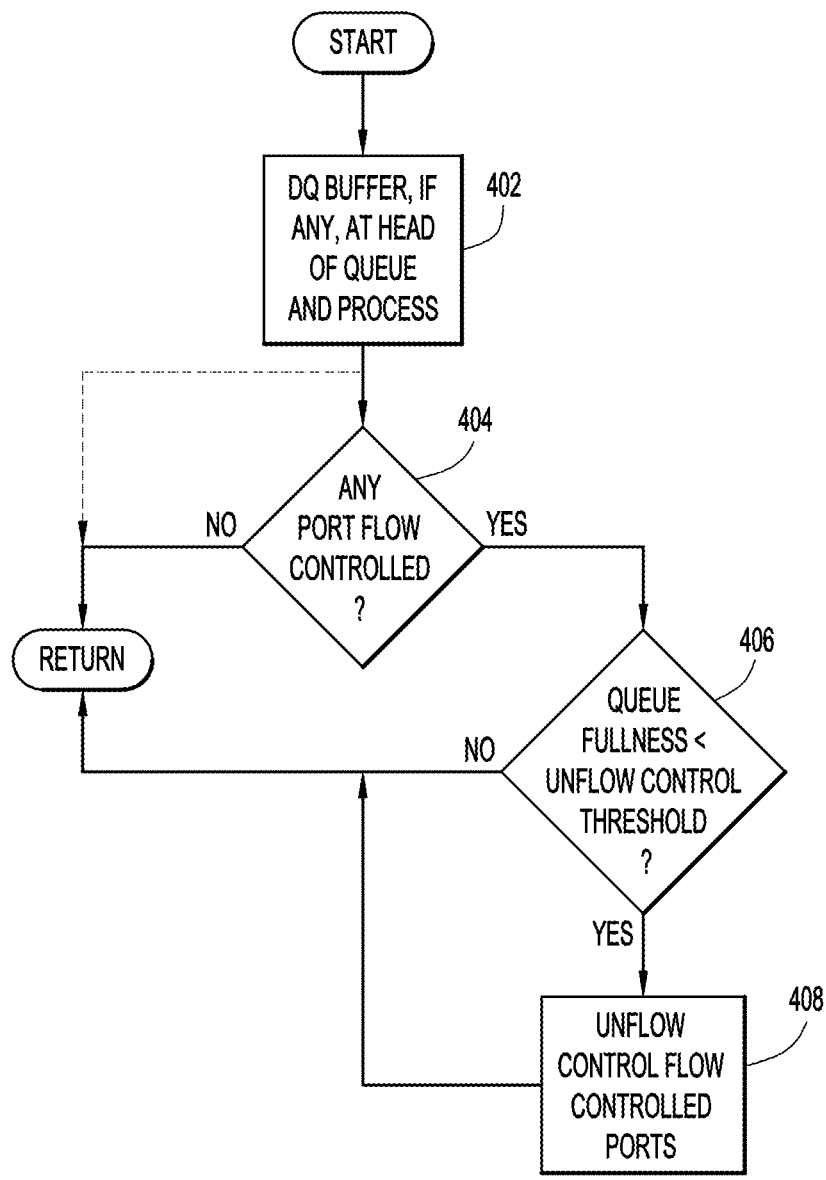
FIG. 4 is a flowchart illustrating dequeue processing operations, according to an example embodiment.

FIG. 4 is a flowchart that illustrates exemplary processing to be performed for dequeueing a packet from the queue for the buffer. This process runs independently of any TDM timeslots. However, in existing systems if packets are the same length, then this process will become synchronized with a TDM timeslot. In accordance with the embodiments presented herein, this synchronization is prevented by having a randomly adjusted queue threshold.

A packet is dequeued from the buffer at 402. In an embodiment in which the action to be performed is to flow-control a given port, network device 100 may determine whether any port is in a flow-controlled state at 404. If it is determined that no port is in a flow-controlled state, the process may be completed. Otherwise, network device 100 may determine whether a fullness of the queue is less than an unflow control threshold at 406. If the fullness of the queue is determined to be less that the unflow control threshold, then the ports that are in the flow-controlled state may be unflow controlled at 408. Otherwise, the process is completed when it is determined that the queue fullness is not less than the unflow control threshold.

The queue management techniques presented herein are useful for a variety of applications, including: admission control at various hierarchies (memory, service-pools, queues), handling of unicast/multicast traffic, CPU management, switched port analyzer network (SPAN) traffic, handling of lossless traffic to determine flow-control in oversubscribed scenarios, datacenter network traffic flow, etc. The flow-control use case is described above, and this may involve allowing a flow-control window to close, sending a negative acknowledgement (NAK) to another device in a network to indicate a flow-controlled condition, sending an XOFF signal, etc.

Figure 5:
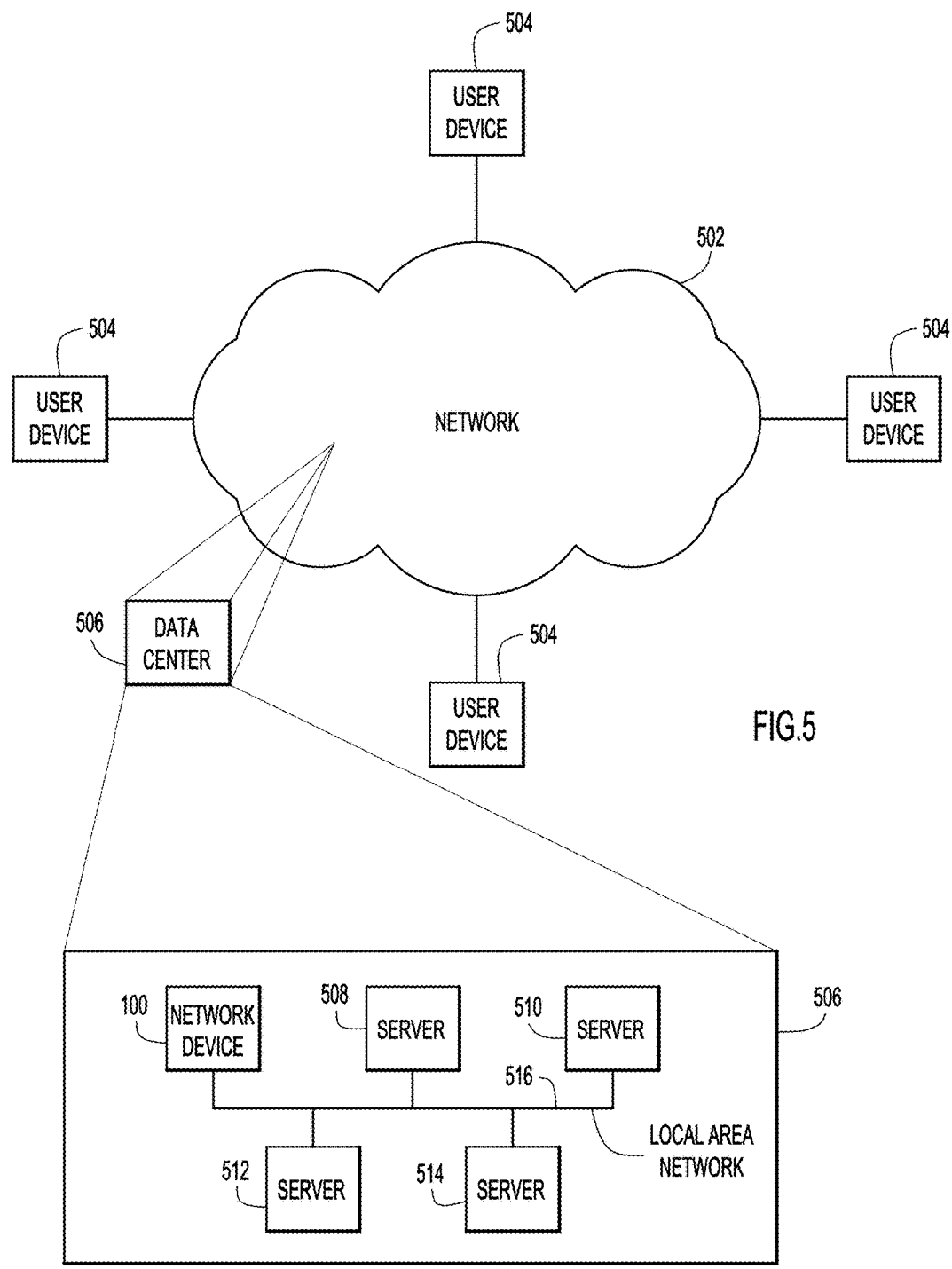
FIG. 5 is a diagram illustrating a network environment in which the queue management techniques presented herein are executed by a network device, according to an example embodiment.

FIG. 5 illustrates an example network environment in which embodiments presented herein may operate. Network 502 may be a network providing connectivity among a number of various devices. Network 502 may be implemented by any number of any suitable communications media (e.g., wide area network (WAN), local area network (LAN), Internet, Intranet, etc.). A datacenter 506 may be connected to or part of network 502. The datacenter 506 may include a network device 100 and a number of devices including, but not limited to servers 508, 512, 514. Servers 508, 512, 514 may be connected to each other and with network device 100 via a local area network 516. Although only one network device 100 is shown in FIG. 5, a number of network devices 100 may exist within the data center 506, each of which may be receiving and outputting network traffic moving between two or more devices. Many of the two or more devices may be user devices 504 connected to network 502. It should also be understood that other entities in the network that source or receive network traffic that passes through the network device 100 may include servers running one or more applications to which user devices 504 connect. The network traffic may be unicast traffic or multicast traffic.

The network traffic may include datagrams, which are transmitted without an expectation of receiving an acknowledgment from a receiving device, as well as other traffic, which may be acknowledged by a receiving device. While datagram traffic does not employ any flow-control mechanism, other types of traffic may employ a flow-control mechanism. When the network traffic uses a flow-control mechanism, network device 100 may flow-control incoming traffic when an adjusted queue threshold of a queue for an output buffer is exceeded, as previously described. In some embodiments, network device 100 may drop a packet of the network traffic when placing the packet in the queue for the output buffer would cause the adjusted queue threshold to be exceeded.

Again, in a shared buffer switch/router (or any network device), a mechanism is provided for per input fairness to congested queues (unicast/multicast per class per port)/pools/CPU/SPAN spaces by adding random noise to the respective thresholds. This mechanism avoids the need to maintain per input per queue/pools/CPU/SPAN state. Per input fairness to a congested output is achieved without having to maintain state per input per output per class-of-service.

In sum, embodiments described here are directed to a method, an apparatus, and one or more computer readable storage media (storing instructions executable by a processor) for providing source fairness on congested queues using random noise. A network device receives a packet at a port from among a number of ports. A queue threshold for a queue is randomly adjusted. When a fullness of the queue exceeds the adjusted queue threshold, at a time when the packet is to be enqueued into the queue, an action is performed. The action may include either dropping the received packet or flow-controlling the port at which the packet is received.

Although the method, system, and one or more computer readable storage media are illustrated and described herein as embodied in one or more specific examples, it is nevertheless not intended to be limited to the details shown, since various modifications and structural changes may be made therein without departing from the scope of the system, the method, and the one or more computer readable storage media and within the scope and range of equivalents of the claims. Accordingly, it is appropriate that the appended claims be construed broadly and in a manner consistent with the scope of the system, the method, and the one or more computer readable storage media, as set forth in the following.

What is claimed is:

1. A method comprising:
at a network device, receiving a packet of a plurality of packets at a port of a plurality of ports;
at a time when the received packet is to be enqueued into a queue of an output buffer of the network device:
generating a random number;
randomly adjusting a queue threshold for the queue of the output buffer to which the received packet is to be stored by reducing a maximum queue threshold by an amount based on the random number; and
performing an action for the received packet when a fullness of the queue exceeds the adjusted queue threshold, wherein the action includes:
either
dropping the received packet,
or
flow-controlling the port at which the received packet is received,
wherein the generating the random number further comprises generating a new random number for each subsequent packet of the plurality of packets received and wherein the randomly adjusting further comprises randomly adjusting the queue threshold based on the new random number that is generated for each of the subsequent packets of the plurality of packets received, wherein the amount based on the random number is a percentage based on the random number.

2. The method of claim 1, wherein the random number is uniformly distributed within a range.

3. The method of claim 2, wherein the random number is an integer in the range from zero to a maximum value.

4. The method of claim 3, wherein the maximum value is configurable.

5. The method of claim 1, wherein packets received for the plurality of ports are enqueue processed at assigned time slots for storage to the output buffer of the queue based on the randomly adjusted queue threshold.

6. The method of claim 5, further comprising:
dequeueing an oldest received packet in the queue and preparing to output the dequeued oldest received packet.

7. The method of claim 6, further comprising:
identifying at least one port of the plurality of ports that is flow-controlled;
determining whether a fullness of the queue is less than a control threshold, wherein the determining is performed when the at least one port is flow-controlled; and
unflow-controlling the at least one port based on a determination that the fullness of the queue is less than the control threshold.

8. An apparatus comprising:
a plurality of ports at which a plurality of packets are received;
an output buffer; and
a processor configured to:
at a time when a received packet of the plurality of packets is to be enqueued into a queue of the output buffer:
generate a random number;
randomly adjust a queue threshold for the queue of the output buffer to which the received packet is to be stored by reducing a maximum queue threshold by an amount based on the random number; and
perform an action for the received packet when a fullness of the queue exceeds the adjusted queue threshold, wherein the action includes:
either
dropping the received packet,
or
flow-controlling the port at which the received packet is received,
wherein to generate the random number further comprises the processor further configured to generate a new random number for each subsequent packet of the plurality of packets received and wherein to randomly adjust further comprises the processor further configured to randomly adjust the queue threshold based on the new random number that is generated for each of the subsequent packets of the plurality of packets received, wherein the amount based on the random number is a percentage based on the random number.

9. The apparatus of claim 8, wherein the random number is uniformly distributed within a range.

10. The apparatus of claim 9, wherein the random number is an integer in the range from zero to a maximum value.

11. The apparatus of claim 10, wherein the maximum value is configurable.

12. The apparatus of claim 8, wherein packets received for the plurality of ports are enqueue processed at assigned time slots for storage to the output buffer of the queue based on the randomly adjusted queue threshold.

13. The apparatus of claim 12, wherein the processor is further configured to dequeue an oldest received packet in the queue and prepare to output the dequeued oldest received packet.

14. The apparatus of claim 13, wherein the processor is further configured to:
identify at least one port of the plurality of ports that is flow-controlled;
determine whether a fullness of the queue is less than a control threshold, wherein the determining is performed when the at least one port is flow-controlled; and
unflow-control the at least one port based on a determination that the fullness of the queue is less than the control threshold.

15. At least one non-transitory computer readable storage medium having instructions stored thereon that, when executed by a processor in a network device, cause the processor to perform operations comprising:
obtaining a received packet of a plurality of packets received at a port of a plurality of ports of the network device;
at a time when the received packet is to be enqueued into a queue of an output buffer of the network device:
generating a random number;
randomly adjusting a queue threshold for the queue of the output buffer to which the received packet is to be stored by reducing a maximum queue threshold by an amount based on the random number; and
performing an action for the received packet when a fullness of the queue exceeds the adjusted queue threshold, wherein the action includes:
either
dropping the received packet,
or flow-controlling the port at which the received packet is received, wherein the generating the random number further comprises generating a new random number for each subsequent packet of the plurality of packets received and wherein the randomly adjusting further comprises randomly adjusting the queue threshold based on the new random number that is generated for each of the subsequent packets of the plurality of packets received, wherein the amount based on the random number is a percentage based on the random number.

16. The non-transitory computer readable storage medium of claim 15, wherein the random number is uniformly distributed within a range.

17. The non-transitory computer readable storage medium of claim 16, wherein the random number is an integer in the range from zero to a maximum value.

18. The non-transitory computer readable storage medium of claim 17, wherein the maximum value is configurable.

19. The non-transitory computer readable storage medium of claim 15, wherein packets received for the plurality of ports are enqueue processed at assigned time slots for storage to the output buffer of the queue based on the randomly adjusted queue threshold.

20. The non-transitory computer readable storage medium of claim 19, wherein the instructions, when executed by the processor in the network device, cause the processor to perform further operations comprising dequeueing an oldest received packet in the queue and preparing to output the dequeued oldest received packet.

21. The non-transitory computer readable storage medium of claim 20, wherein the instructions, when executed by the processor in the network device, cause the processor to perform further operations comprising:

identifying at least one port of the plurality of ports that is flow-controlled;

determining whether a fullness of the queue is less than a control threshold, wherein the determining is performed when the at least one port is flow-controlled; and unflow-controlling the at least one port based on a determination that the fullness of the queue is less than the control threshold.

* * * * *